UNITED STATES PATENT OFFICE.

JOHN STUCKES, OF ST. LOUIS, MISSOURI.

PROCESS OF MAKING STICK-CANDY.

No. 800,600.     Specification of Letters Patent.     Patented Sept. 26, 1905.

Application filed June 15, 1905. Serial No. 265,413.

*To all whom it may concern:*

Be it known that I, JOHN STUCKES, a citizen of the United States, and a resident of St. Louis, Missouri, have invented certain new and useful Improvements in Making Candy, of which the following is a specification containing a full, clear, and exact description, reference being had to the accompanying drawings, forming a part hereof.

My invention relates to the manufacture of the class of candy known as "hard-boiled goods," usually made in the form of sticks.

The object of my invention is to improve the quality and cheapen the cost of production of said class of candy. Heretofore in the production of said class of candy it has been very difficult to make use of a large percentage of the cheaper form of sugar, known as "corn-sugar," (glucose,) owing to the fact that the candy produced therewith would quickly become "sticky," especially when exposed to the atmosphere.

In practicing my invention I can make use of a much larger percentage of glucose than could be used heretofore, and I thereby cheapen the cost of production and at the same time produce candy which will remain fresh, clear, and dry for a very long period.

In making candy by my invention I mix the ingredients as follows: sugar, forty-eight pounds; water, sufficient to dissolve the sugar; corn-sugar, (glucose,) fifty-two pounds.

The above is preferably cooked in a common vacuum-pan until the desired condition of the product is arrived at. The candy thus produced is then deposited upon a slab and is made use of to form the body or interior of the stick-candy or other form of hard-boiled goods. Then I take about one and one-fourth pounds of common fats, preferably stearin, and rub into the same a small quantity of powdered sugar, and then I mix this compound thoroughly with the previously-made candy, preferably while the latter is lying on the slab; but of course in some cases I can produce satisfactory results by mixing the fats with the candy while it is still within the vacuum-pan. I next make another separate quantity of candy in the manner just above described, and this second quantity I make use of to form the outer casing or shell of the sticks or other forms of fat-mixed candy previously made in the manner described.

I do not confine myself to any specific form of fats, as I have found that any common wholesome fats which have a melting-point not lower than 50° Fahrenheit will be suitable for the purpose. I of course prefer such fats as cocoa-butter or suets, and I can use any edible fat, either animal, vegetable, or mineral.

The candy produced by my improved process is much more palatable than could be heretofore produced by the old process in which corn-sugar (glucose) is used.

I have discovered that the mixture of fats with the two bodies of candy protects it from the dampness of the atmosphere, or in any event I have found that the mixture prevents the candy from becoming sticky with dampness.

Candy made in accordance with my invention will not change color or become stale.

The greatest quantity of corn-sugar (glucose) that could be used in making hard-boiled candy with the old method was about fourteen pounds of glucose to one hundred pounds of sugar and if the candy is cooked in a vacuum-pan about thirty-five pounds of corn-sugar (glucose) to one hundred pounds of sugar. If more glucose than this were used, the goods would not stand, but would become sticky and run. In practicing my process I can use as high as eighty per cent. of corn-sugar (glucose) to only twenty per cent. of sugar, and the candy produced will not get sticky or run.

The usual coloring and flavoring materials should of course be used in making the candy.

What I claim is—

The herein-described process of making stick-candy and similar hard-boiled goods, consisting in making two separate masses of candy by boiling sugar and corn-sugar (glucose) in water, making one of said masses with a greater percentage of glucose than is contained in the other mass; mixing a common fat with both of said masses of candy; making from the said mass which contains the largest percentage of glucose the body or interior of the pieces of candy, and forming from the remaining mass the outer shell of said pieces of candy; substantially as specified.

In testimony whereof I have signed my name to this specification in presence of two subscribing witnesses.

JOHN STUCKES.

Witnesses:
   JOHN C. HIGDON,
   M. P. SMITH.